March 8, 1955     R. F. TATOM     2,703,431
LATCH HINGE
Filed Jan. 12, 1953

INVENTOR.
RAYMOND F. TATOM
ADMINISTRATRIX
MRS. JEAN H. TATOM
BY Glenn Orlob
AGENT

United States Patent Office 2,703,431
Patented Mar. 8, 1955

2,703,431

LATCH HINGE

Raymond F. Tatom, deceased, late of Puyallup, Wash., by Jean H. Tatom, administratrix, Tacoma, Wash., assignor to Boeing Airplane Company, Seattle, Wash., a corporation of Delaware Application January 12, 1953, Serial No. 330,635

4 Claims. (Cl. 16—147)

This invention relates to a latch-hinge for fastening structural panels to one another or to a structural frame.

The invention is a combination latch and hinge means for interconnecting structural members and comprises a hook-assembly attached to one structural member consisting of a slidable hook moved by an actuating lever equipped with both safety catches and an adjustable link, and a hook-receiving assembly attached to another adjacent structure consisting of an integrally mounted hook-receiving pin located within a recess in the structure; the two assemblies being so arranged that the interlocking of the hook and the pin firmly holds together the structural members.

The invention provides a combination latch and hinge for the following purposes: the secure attachment of a panel, cowl section or other structural member to a structural frame; the convenient quick mounting or removal of a panel or cowl section; and the hinged mounting of a panel or cowl section about any one of its sides.

The purposes will become more apparent as the following description is read with reference to the drawing wherein like numerals designate the same parts throughout the several views. In the drawings.

Figure 1:
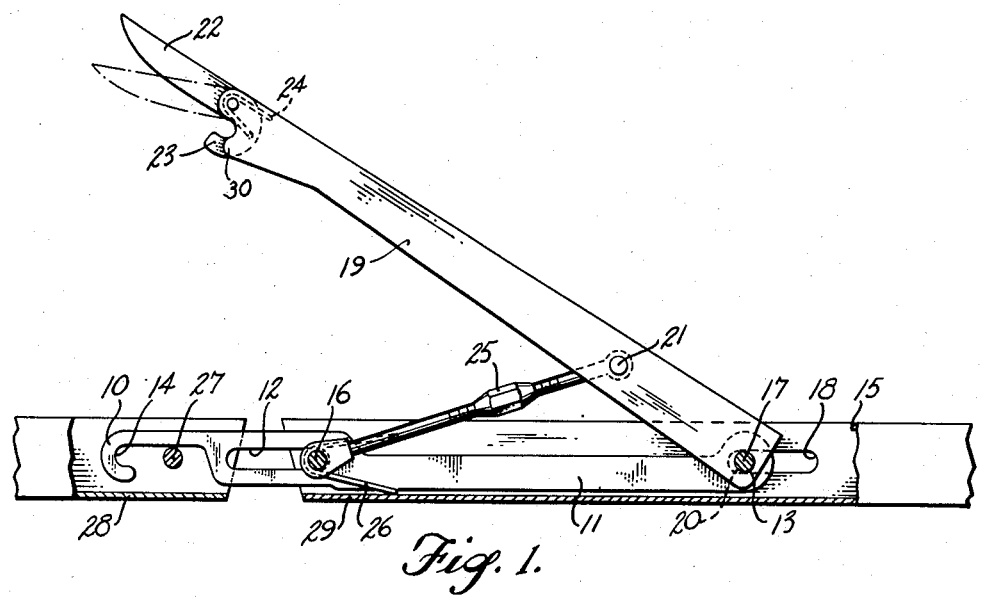
Figure 1 is a sectional elevation of a portion of the latch-hinge in the released position.

With reference to the drawings, the invention briefly outlined comprises a lever 19, a hook 10 slidably moved by the lever 19, both the lever 19 and the hook 10 mounted as a unit with integral safety devices 23 within a unit frame or to a structural member 15, thereby providing operable means for firmly surrounding a hook receiving pin 27 integrally attached to an adjacent structural member 28.

More particularly described, the invention comprises the slidable hook 10 with a bar shaped body 11 slotted at 12 near its extended hooked end 14, and drilled at 13 for a pin 17 attachment at its opposite end. The hook 10 is mounted to its unit frame or to the structure 15 by the structure guide pin 16 which passes through the hook-slot 12 and the structure-pin 17 which passes through the hook-hole 13 and in turn is slidably secured to structural member 15 through the slots 18, 18. By this mounting, the hook 10 is guided for lineal movement paralleling the surface of the structure 15.

The lineal movement of the slidable hook 10 is controlled by the manual operation of the lever 19. The lever has: (1) a formed bar shaped body with a hole 20 in its pivot end to accommodate the sliding structure-pin 17; (2) an integral cross pin 21 intermediate its length to receive one end of an adjustable link 25; (3) a finger-operated catch 22, 23 biased by spring 24 and secured to the free end of the lever for gripping the hook receiving pin 27 on the adjacent structure 28; and (4) an abutting portion 30 on the free end of the lever supplementing the hook 14 to surround completely the hook receiving pin 27 on the adjacent structure 28.

The lever 19 is retained in the best operating position relative to the hook 10 and the structure 15 by the adjustable link 25 designed to compensate for variations occurring within the manufacturing tolerances. The link 25 is joined to the lever 19 by the cross-pin 21 and to the structure 15 by the guide pin 16. The lever 19 is spring biased to its released position by the spring 26 surrounding the guide pin 16, the spring ends being anchored respectively to the structure 15 and to the adjustable link 25.

Some of the parts referred to singularly above may be duplicated and spaced side by side to obtain a balanced structure for a more efficient clamping action. This is illustrated in Figure 3 where two hooks 10, 10, two levers 19, 19 and their respective catches 23, 23 are shown in their relative positions.

With respect to the operation of the installed latch-hinge, Figure 1 illustrates the released position. The lever 19 swings outwardly from the exterior of the structures 15 and 28 sliding the hook 10 into the structure 28 thereby clearing the hook receiving pin 27. When all latch-hinge units attached to a removable structural member are moved to this released position, then the member itself can be removed.

Figure 2:
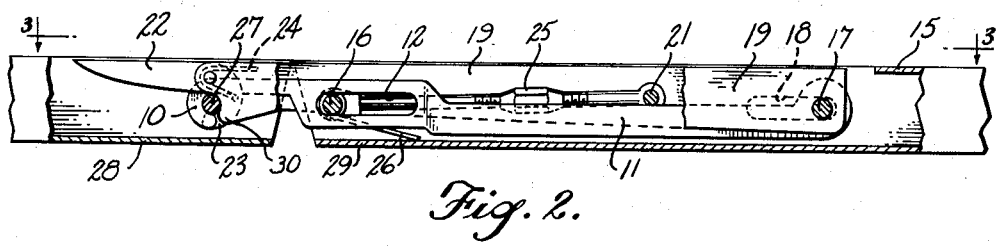
Figure 2 is a sectional elevation of a portion of the latch-hinge shown in the closed position in Figure 3, taken on line 2—2.
Figure 3:
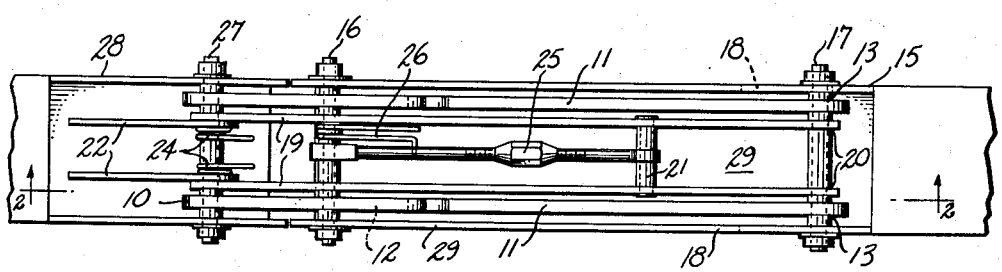
Figure 3 is a sectional view of the assembly of Figure 2 taken on line 3—3.

The closed position of the latch-hinge unit is illustrated in Figures 2 and 3. The unit is closed when its lever 19 is moved into a flush relationship with the structures 15 and 28. During this closing movement, the toggle action of each lever 19 and its link 25 moves the slidably mounted pin 17 toward the center of the structure 15 causing the hook 10 to slide back into the structure 15 so its hooked-end 14 will grip the hook receiving pin 27 on the adjacent structure 28. The continued rotation of the lever 19 draws the pins 16 and 27 together and consequently the structures 15 and 28 together.

The hinge feature is useful whenever only a partial mounting or demounting of a structural member 15 is required. The release of the latch-hinges on three sides of the panel keeping those on the fourth side secured provides the hinged axis for rotating the member 15. The strength of the latch-hinge when employed as a hinge is enhanced by the design wherein the portion 30 on the free end of the lever 19 combines with the hook end 14 on the hook 10 completely surrounding the hook receiving pin 27.

The safety locking means of the latch-hinge is carried by the lever 19. It is a spring biased catch 23 which engages the hook receiving pin 27 when the latch-hinge is closed. It can only be released by finger motion at the gripping place 22.

Having now particularly described and ascertained the nature of said invention and in what manner the same is to be performed, what is claimed is:

1. In a combined latch and hinge mechanism adapted to engage a receiver pin, said latch and hinge mechanism comprising a structural frame member, a co-operating hook bar slidably mounted in the said structural frame member, a lever pivotally connected to one end of the said hook bar for moving the said bar into engagement with a receiver pin, an adjustable link attached to the said lever and said structural member as a lever positioning means, and a pivotal spring biased catch on the extending end of the said lever to grip a receiver pin securing the latch-hinge mechanism.

2. In a combined latch and hinge mechanism adapted to engage a receiver pin, the latch and hinge mechanism comprising a frame, a gripping hook slidably mounted in the frame, an operating lever pivotally secured to the gripping hook at the end opposite the hook end for slidably moving the hook, an adjustable link connecting the lever at a point intermediate its ends to the frame at a point substantially removed from the pivot of the lever for variably controlling the limits of the lever movement, and a spring biased catch on the rotating end of the lever to secure the latch and hinge mechanism, as the spring catch supplements the hook in gripping a receiver pin.

3. A latch and hinge mechanism for incorporation into a structure of a removable panel of an airplane in spaced relationship with other mechanisms to provide a substantial portion of means utilized for mounting the removable panel, comprising a frame, a guide pin removably inserted in the frame near one end, another pin slidably and removably mounted near the other end of the frame, a slidable hook mounted in the frame on the pins with the hooked end extendable beyond the edge of the frame, the guide pin passing through a slotted hole in the slidable hook and the slidable pin passing through a complementary hole in the slidable hook, a rotatable lever attached at one end to the slidable pin and the opposite end including a catch means that combines with the hook substantially forming an eyelet, and an adjustable link secured at one end to the guide pin and at the other end to the lever intermediate its end, to regulate the motion of the slidable hook when an operating force is applied by rotating the lever, the adjustment means on the link serving to compensate for variances in the spacing between a hook receiving means and the hook.

4. In each device of a group of latch-hinge devices for mounting on a removable panel to connect the panel sides in a hinged relationship with a surrounding non-removable structure, a latch and hinge mechanism adapted to engage a receiver pin comprising a frame, a slidable hook pin mounted on the frame, a lever pivotally connected to the hook, an adjustable linkage connected between the frame near the hook end and the lever intermediate its ends to define the limits of the lever movement utilized to slide the hook, and a catch on the extending end of the lever to form an eyelet in conjunction with the hook end.

References Cited in the file of this patent

UNITED STATES PATENTS

| | | |
|---|---|---|
| 2,424,962 | Best | Aug. 5, 1947 |
| 2,472,285 | Claud-Mantle | June 7, 1949 |
| 2,477,472 | Wright | July 26, 1949 |

FOREIGN PATENTS

| | | |
|---|---|---|
| 981,093 | France | Jan. 10, 1951 |